United States Patent

Matsuda et al.

[15] 3,689,079
[45] Sept. 5, 1972

[54] PHONOGRAPH UTILIZING A ROTATIONAL ANGLE DETECTOR FOR SOUND TRACK SELECTION

[72] Inventors: Hitoshi Matsuda; Hideaki Hayashi; Tetsuro Araki; Shinichi Koga, all of Tokyo, Japan

[73] Assignee: Nippon Columbia Kabushikikaisha (Nippon Columbia Co., Ltd.), Tokyo, Japan

[22] Filed: Dec. 24, 1968

[21] Appl. No.: 786,552

[30] Foreign Application Priority Data

Dec. 30, 1967 Japan..................42/85204

[52] U.S. Cl. ..274/9 RA, 179/100.1 PS, 179/100.4 D, 250/231 SE
[51] Int. Cl. .............................................G11b 3/06
[58] Field of Search..................274/9 R, 15 R, 10 R; 250/231 SE, 225, 231 R; 179/100.1 PS, 100.4 D, 9 RA

[56] References Cited

UNITED STATES PATENTS

| | | | |
|---|---|---|---|
| 3,306,159 | 2/1967 | Beall | 250/225 |
| 3,368,080 | 2/1968 | Nakagivi | 274/15 |
| 3,503,615 | 3/1970 | Matsuda | 274/10 |

*Primary Examiner*—Bernard Konick
*Assistant Examiner*—Raymond F. Cardillo, Jr.
*Attorney*—Hill, Sherman, Meroni, Gross & Simpson

[57] ABSTRACT

A sound track selection phonograph comprises a pick-up arm rotational angle detector mounted on a rotary shaft of the pick-up arm. The output signal of the detector is divided into a plurality of signals during one turn of a record, and those divided signals are memorized and compared to a plurality of divided output signals obtained by the rotational angle detector in the next succeeding turn of the record, thereby to ascertain the difference between the signals to produce a detecting signal.

21 Claims, 19 Drawing Figures

INVENTORS
Hitoshi Matsuda, Hideaki Hayashi,
Tetsuro Araki & Shinichi Koga

ATTORNEYS

PHONOGRAPH UTILIZING A ROTATIONAL ANGLE DETECTOR FOR SOUND TRACK SELECTION

BACKGROUND OF THE INVENTION

1. Field of the Invention

This invention relates to a phonograph record player, and more particularly to a sound track selection phonograph of the type automatically selecting a desired sound track from a plurality of discrete sound tracks on a record and playing the selected sound track.

2. Description of the Prior Art

Conventional types of sound track selection devices for use with sound track selection phonographs have drawbacks such as complexity in construction, high manufacturing cost and lowered precision in sound track selection which is unavoidable in view of various types of records. Further, the prior art devices exert a bad influence upon the vibration system of the pickup of the phonographs.

SUMMARY OF THE INVENTION

One object of this invention is to provide a sound track selection phonograph having a rotational angle detector in which a special polarizing plate is ganged with the pickup shaft so as to eliminate the variations in electric signals due to changes of the light source and dispersion of the photoelectric element of a conventional detector for converting a rotational angle of the pickup arm into an electric signal by making use of light.

Another object of this invention is to provide a sound track selection phonograph having a circuit which assures avoidance of the influence of the eccentricity of the turntable and distortions of the record upon the output of the rotational angle detector.

A further object of this invention is to provide a sound track selection phonograph which is provided with a sound detector so as to assure discrimination between sound track grooves and guide grooves.

Still a further object of this invention is to provide a sound track selection phonograph which is adapted to be brought into a stand-by position by manual location of the stylus on the record at a sound track groove desired to be played, a guide groove or a sound track groove preceding it.

Other objects, features and advantages of this invention will become apparent from the following description taken in conjunction with the accompanying drawings.

DESCRIPTION OF THE PREFERRED EMBODIMENTS

Figure 1:
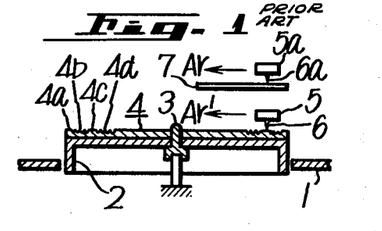
FIGS. 1 to 3 are fragmentary side views, partly in cross-section, of conventional sound track selection phonographs.

For a better understanding of the present invention a description will be given of the prior art. In the prior art the beginning of a desired sound track selected from a plurality of discrete various sound tracks on a record is mechanically detected by making use of the difference in depth between sound track grooves 4b and 4d of the record 4 mounted on a spindle 3 on a turntable placed on a motor board at a predetermined position and guide grooves 4a and 4c of the record 4, as illustrated in FIG. 1. This mechanical detection is usually achieved by scanning the record 4 through a thin cushion sheet 7 mounted thereon (though shown in spaced relation to the record 4 for convenience of illustration) with an ordinary pickup arm 5a having a stylus 6a in a direction of an arrow Ar or with an arm 5 (different from the arm 5a) having a detecting needle 6 formed of a conductive rubber or the like in a direction of an arrow Ar' without using the cushion sheet 7.

However, these conventional methods have defects including, for example, complicated construction requiring the cushion sheet 7 and the special arm 5 having the detecting needle 6 carried thereon, and produce great errors in the detection due to mechanical detection of the difference in depth between the sound track grooves 4b, 4d and the guide grooves 4a, 4c.

Figures 3, 4, 5:
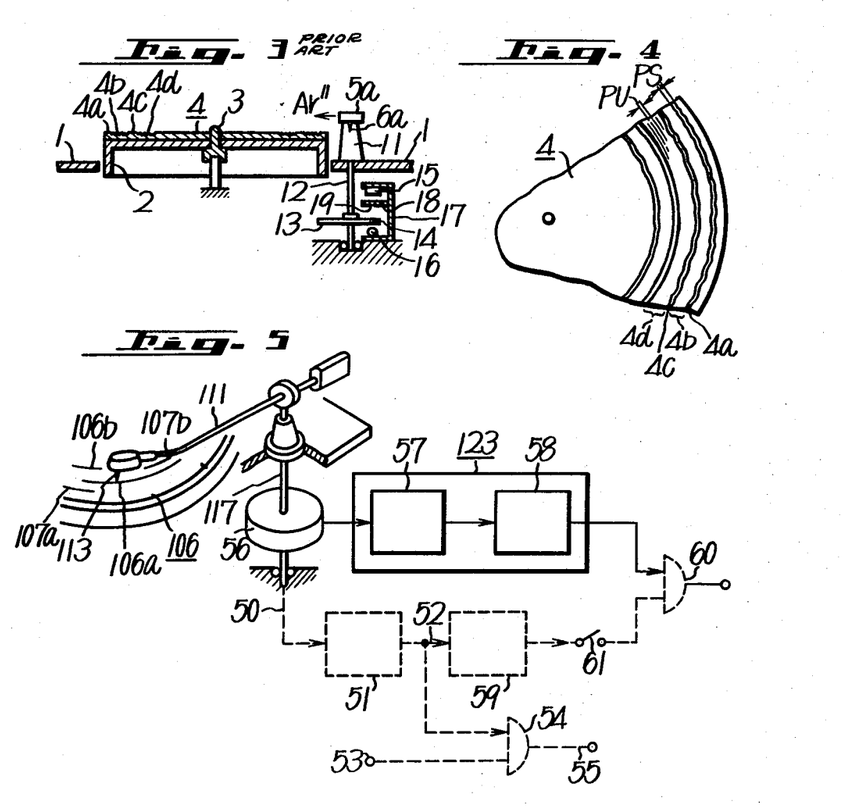
FIG. 4 is a plan view partially broken away of a record having formed thereon sound track grooves and guide grooves at varying pitch.
FIG. 5 is a perspective view of a sound track selection phonograph according to this invention having a portion in block diagram form.

Further, in usual records the width of the guide grooves is greater than that of the sound track grooves but in records having formed thereon the sound tracks at variable pitch the groove width Ps of the sound tracks 4b and 4d sometimes exceeds that Pu of the guide grooves 4a and 4c as shown in FIG. 4. In such a case, the prior art methods cannot detect the guide grooves.

Figure 2:
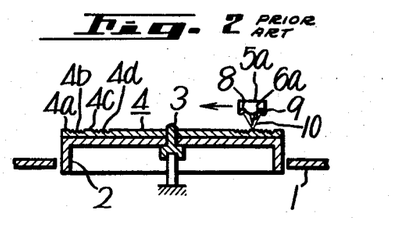

In addition, there has been proposed an optical method for detecting the difference in depth between the sound track grooves 4b, 4d and the guide grooves 4a, 4c formed on the record 4 by the use of a light source 8 and a photoelectric conversion element 9 such as a photocell mounted on the cartridge of the pickup arm 5a and arranged in such a manner as to direct a beam of light from the light source 8 onto the photoelectric conversion element 9 by reflection of the light beam from the surface of the record 4 beneath the cartridge, as exemplified in FIG. 2. However, this method cannot be used with high-precision pickup arms because a rotational angular position detecting means mounted on the top of the pickup arm cartridge causes an increase in the stylus pressure and exerts a bad influence upon the vibration system of the pickup arm.

To overcome the drawbacks encountered in the prior art, one of the inventors of the present invention has proposed in his prior application U. S. Ser. No. 608,583, now U.S. Pat. No. 3,503,615, a sound track selection phonograph such as depicted in FIG. 3, in which similar elements to those in FIG. 1 are identified by the same reference numerals. As shown in the figure, a rotary shaft 12 revolving with the rotational movement of the pickup arm 5a in a direction of an arrow Ar" is extended downwards through a support 11 of the pickup arm 5a and the motor board 1; a rotary disc 13 having a slot 14 gradually increasing in area in a circumferential direction is affixed to the rotary shaft 12; a beam of light from a light source 16 disposed on a fixed part 17 is received by a photoelectric conversion element 15 through the slot 14 and a straight slot 19 bored through a plate 18 mounted on the fixed part 17; and the output of the element 15 is applied to a differentiation circuit to distinguish between the guide grooves and the sound track grooves of usual records or detect the groove width Ps of the sound tracks and that Pu of the guide grooves formed on records at varying pitch. This method considerably alleviates the drawbacks described above but the output of the photoelectric element 15 is likely to disagree with the amount of light passing through the slots 14 and 19 due to the configuration and partial non-uniformity of the light source 16 and the light-receiving face of the photoelectric conversion element 15. In addition, since the light-receiving area of the photoelectric conversion element 15 is usually small, this method requires a high degree of precision in assembling and adjustment of the phonograph.

Now, a detailed description will be given in connection with one embodiment of a sound track selection phonograph of this invention, which is adapted to be automatically set in its standby condition by placing the pickup stylus on a record at a sound track desired to be played, a guide groove or a sound track preceding it and by depressing a stand-by button. In FIG. 5 reference numeral 111 indicates generally a pickup arm and 106 a record. There are three methods of location of the pickup arm 111 at a predetermined position of the record 106. The first method consists in placing a stylus 113 attached to the free end of the pickup arm 111 at a guide groove 107b preceding a sound track, for example, 106b desired to be played. In this case an output 50 of the pickup cartridge is applied to a sound detecting circuit 51 and when the stylus 113 moves into the selected sound track 106b sound is detected by the sound detecting circuit 51. The direction of the revolution of the turntable is reversed by a sound output 52 of the sound detecting circuit 51, and a signal 53 produced by the reversal and the sound output 52 are applied to an AND circuit 54 to derive an output signal 55 therefrom, by which the signal 53 is turned off to bring the pickup stylus 113 to a predetermined position of the guide groove 107b, setting the phonograph in its stand-by condition.

The second method is to locate the stylus 113 directly in the sound track 106b desired to be played. In this case, after the location of the stylus 113 at the selected sound track of the record the turntable is reversed and a guide groove preceding the selected sound track is detected by a rotational angle detector 56. The guide groove is detected by a guide groove detecting circuit 123 including a sampling circuit 57 and a memory circuit 58 for removing an output component caused by distortion of the record and eccentricity of the turntable, but the detection of the guide groove may be achieved with higher accuracy by ascertaining the absence of the output of the sound detecting circuit, since no sound signal is present in the guide groove. To this end, the output of the sound detecting circuit 51 and the output signal of the guide groove detecting circuit 123 may be fed to an AND circuit 60. In FIG. 5 reference numeral 59 designates a circuit for avoiding a faulty operation due to non-signal portions in the sound track being mistaken for the guide groove because there are non-signal periods in case of, for example, pauses during scanning of the stylus on the sound track. In the event a record has, for example, applause recorded into the guide groove portion, an output is produced in the sound detecting circuit during scanning of the guide groove to produce an output signal in the AND circuit 60 at such a position corresponding to the guide groove, thereby disturbing the detection of the guide groove. To avoid this, it is preferred to interpose a switching circuit 61 between the AND circuit 60 and the sound detecting circuit 51 and to selectively operate the switching circuit 61 in accordance with the kind of a record to be played. The signal of the guide groove thus produced is detected to drive the turntable in a forward direction and when the sound of the beginning portion of the sound track 106b is detected by the sound detecting circuit 51 the turntable is reversed again and stopped at such a position that the stylus 113 lies at a predetermined position of the guide groove 107b, thus setting the phonograph in its stand-by condition.

The third method is to place the stylus 113 at a sound track 106a preceding the sound track 106b desired to be played. This method is substantially similar to the above second method except in the difference of the turntable driving system. Namely, the stylus 113 is placed at the sound track 106a preceding the sound track 106b to be played back and the turntable is driven in a forward direction. When the stylus 113 moves in the succeeding guide groove a guide groove detecting output is obtained and when the stylus 113 further moves in the selected sound track 106b the sound recorded at the beginning of the sound track 106b is immediately picked up by the sound detecting circuit 51 to produce an output. Then the turntable is driven in a reverse direction and is stopped at such a position that the stylus 113 lies at a predetermined position of the guide groove 107b, thus setting the phonograph in its stand-by condition.

Although the phonograph of this invention may adopt various constructions according to where the pickup arm 111 is manually located on the record as has been described above, the fundamental constructional elements are the rotational angle detector (the guide groove detector), the guide groove detecting circuit, the sound detecting circuit and the turntable driving circuit.

Figure 6:
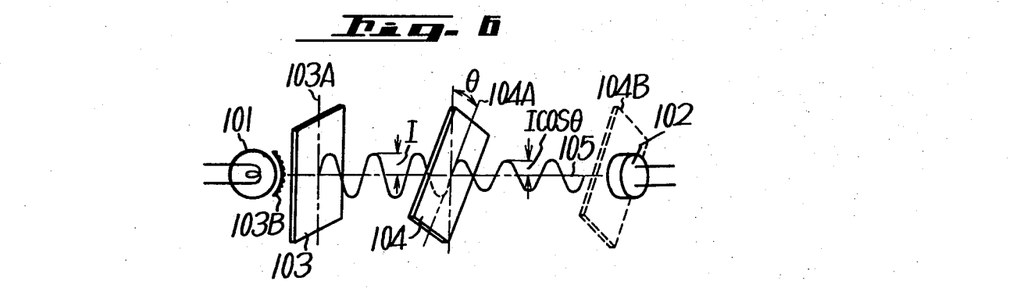
FIG. 6 is a diagram for explaining the principle of the rotational angle detector of this invention.
Figure 7:
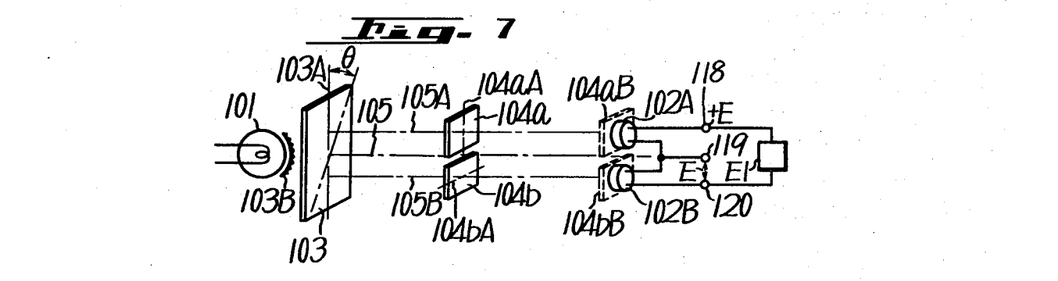
FIG. 7 is a diagram for explaining one example of the rotational angle detector produced according to this invention.
Figure 8:
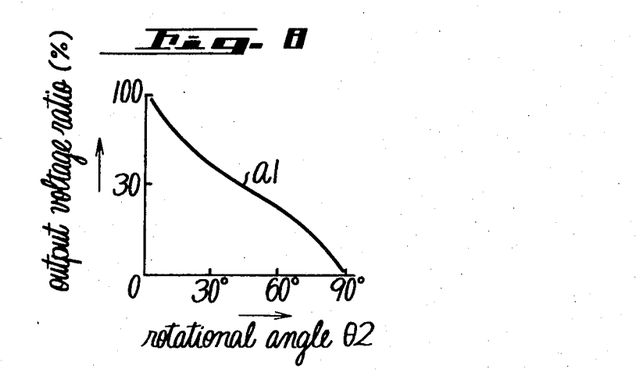
FIG. 8 is a graph showing the relationship between the rotational angle detected by the rotational angle detector of this invention and its output voltage ratio.
Figure 9:
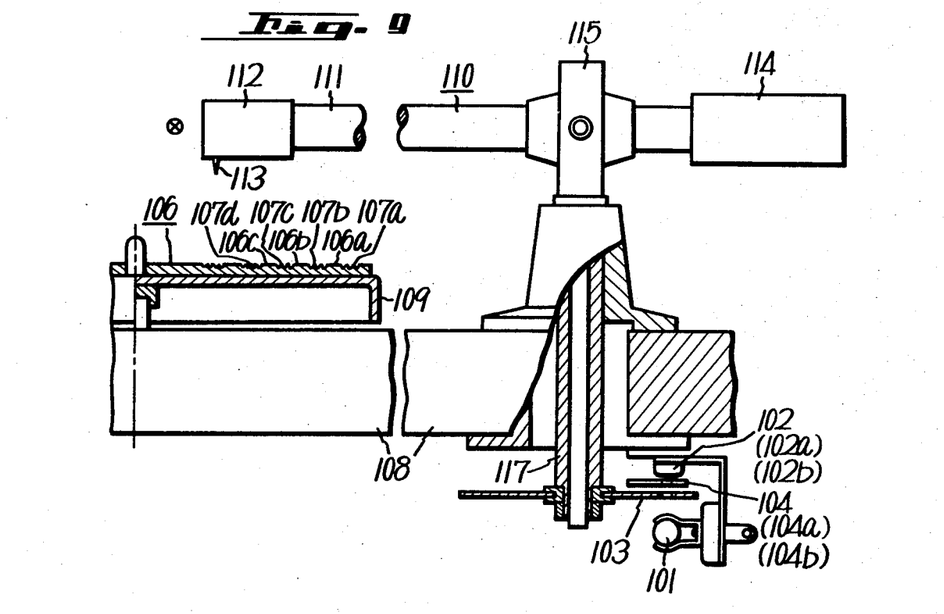
FIG. 9 is an enlarged side view, partly in cross-section, showing one example of the construction of the rotational angle detector produced according to this invention.

Referring now to FIGS. 6 to 10, the rotational angle detector 56 will hereinafter be described in detail. In the present invention a light source 101 and a photoelectric conversion element 102 such as a Cds element or a phototransistor are disposed in opposed relation and two polarizing plates 103 and 104 formed as of or glass and coated with a polarizing film are arranged on a light path 105 between the light source 101 and the photoelectric conversion element 102 in substantially parallel and opposing relation in such a manner that main axes 103A and 104A of the polarizing plates 103 and 104 lie across the light path 105 at right angles thereto, as illustrated in FIG. 6. One of the polarizing plates, for example, 104 is secured to a shaft 117 of the pickup arm 111 (refer to FIG. 5) to rotate about the light path 105 with the rotational movement of the pickup arm 111 in the radial direction of the record. Under such conditions, if the maximum amplitude of the light passing through the polarizing plate 103 is taken as I, when the polarizing plate 104 has rotated through an angle $\theta$ with the rotation of the pickup arm from a position where its main axis 104A is in alignment with that 103A of the polarizing plate 103, the intensity of the light derived from the polarizing plate 104 is expressed by $I\cos\theta$ and the resistance value of the photoelectric conversion element 102 is $R_0/\cos\theta$, where $R_0$ is the resistance value of the photoelectric conversion element when the angle $\theta$ between the main axes 103A and 104A of the polarizing plates 103 and 104 is zero. As is apparent from the above, relative rotation of the polarizing plate 103 or 104 about the advance direction of the light, that is, the light path 105 will derive an electric output from the photoelectric conversion element 102 in proportion to the rotational angle. With such an arrangement, the surface area of the photoelectric conversion element receiving the light is not changed but the amount of light striking against the photoelectric conversion element 102 is varied in accordance with the rotation of the pickup, so that the rotational angle of the pickup arm can be detected in the form of a variation in the amount of light. Although one photoelectric conversion element 102 is used in the above example, two photoelectric conversion elements 102A and 102B may be employed in place of the polarizing plate 104 of FIG. 6 as exemplified in FIG. 7, in which similar reference numerals to those in FIG. 6 designate similar elements. In this case, the photoelectric conversion elements 102A and 102B are operated in a differential manner. Namely, as depicted in the figure, two photoelectric conversion elements 102A and 102B are arranged in parallel relation and two polarizing plates 104a and 104b are positioned on the same plane in opposing relation to the photoelectric conversion elements 102A and 102B on two light paths 105A and 105B directed from the light source 101 to the elements 102A and 102B and, in addition, the common polarizing plate 103 is located across the two light paths 105A and 105B in parallel with the polarizing plates 104a and 104b in the same manner as in the example of FIG. 6. The photoelectric conversion elements 102A and 102B are connected in series to each other and connections are made such that a voltage $E1$ is impressed between two terminals 118 and 120 of the elements 102A and 102B and that an output $E$ is derived from between a connection point 119 of the elements and the other end 120 of the one element, for example, 102B. In this case the polarizing plates 104a and 104b are arranged in such a manner that their main axes 104aA and 104bA are displaced 90° apart from each other and the common polarizing plate 103 is associated with the pickup arm shaft 117 (FIG. 9). When the polarizing plate 103 is rotated about the light path 105 in response to the rotational movement of the pickup arm 111 to form an angle of $\theta_1$ between the main axis 103A of the polarizing plate 103 and that 104aA of the one polarizing plate, for example, 104a, the resistance values of the photoelectric conversion elements 102A and 102B are respectively $R_0/\cos\theta_1$ and $R_0/\sin\theta_1$ and, as a result, the following output voltage $E$ is picked up between the output terminals 119 and 120;

$$E = \frac{\cos\theta_1}{\sin\theta_1 + \cos\theta_1} \cdot E_1 \qquad (1)$$

As is apparent from the above equation (1), the output voltage $E$ is not related to the magnitude of the absolute value of the initial value $R0$ of the photoelectric conversion elements 102A and 102B, so that the variation in brightness of the light source 101 does not exert any influence upon the output voltage $E$. Further, the relative rotational angle between the main axis 103A and those 104aA and 104bA is differentially given, and in other words, the resulting output voltage corresponding to the rotational movement of the pickup arm 111 in the radial direction of the record is high and the linearity can be improved, as compared with the case of FIG. 6. In addition, since the two photoelectric conversion elements 102A and 102B are combined with each other in a differential manner, the variations in their characteristics due to temperature change and so on can be compensated for with each other. Assuming that the photoelectric conversion elements 102A and 102B have resistances $R1$ and $R2$ respectively and that their sensitivities are changed $1/\Delta\alpha$ times due to temperature change, namely if the resistances of the photoelectric conversion elements are changed to $\Delta\alpha R1$ and $\Delta\alpha R2$ due to temperature change, the output voltage $E$ appearing between the terminals 119 and 120 is given by the following formula;

$$E = \frac{\Delta\alpha R_2}{\Delta\alpha R_1 + \Delta\alpha R_2} E_1 = \frac{R_2}{R_1 + R_2} E_1 \qquad (2)$$

and the output voltage $E$ is irrespective of temperature. The variation characteristic of the output voltage ratio (percent) obtained across the terminals 119 and 120 relative to the change of the rotational angle $\theta$ of the pickup of such construction is as indicated by a curve $a_1$ in FIG. 8. As is apparent from the curve $a1$, the combined use of the two photoelectric conversion elements 102A and 102B may cancel the characteristic variation due to a change in brightness of the light source 101 and temperature change of the photoelectric conversion elements, so that it is possible to provide a rotational angle detector which is excellent in precision, simple in construction and inexpensive. Although the above example has been described in connection with the combination of the polarizing plates 103 and 104 or 104a or 104b, it is also possible that the one polarizing plate 103 may be substituted with a polarizing plate 103B directly mounted on the light source 101, as shown in FIG. 7. is omitted. Further, the polarizing plates 104, 104a or 104b may be formed integrally with the photoelectric conversion element 102, 102A or 102B as indicated by broken lines 104B, 104aB or 104bB in FIGS. 6 and 7.

Figure 10:
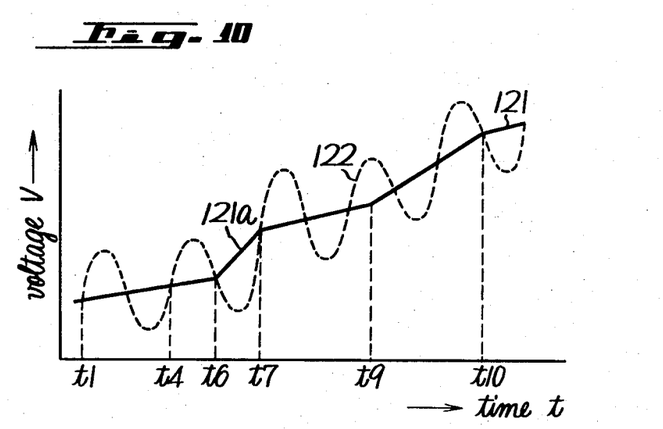
FIG. 10 is a graph showing an output waveform when an output produced by warping of the record and eccentricity of the turntable overlaps the output of the rotational angle detector.
Figure 11:
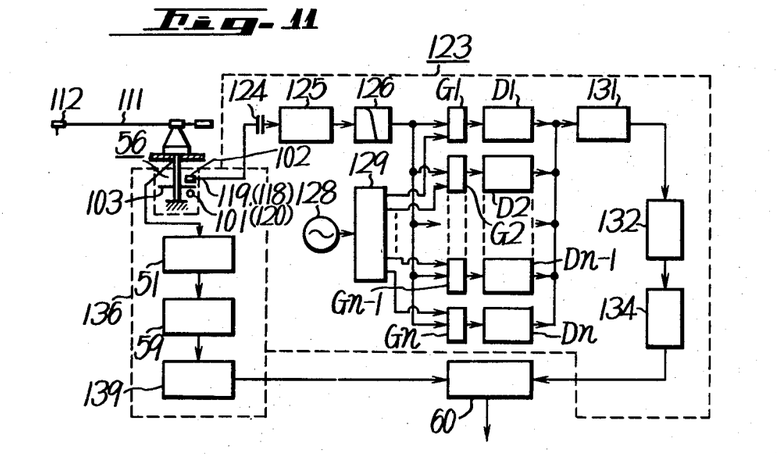
FIG. 11 shows a block diagram of the guide groove detecting circuit depicted in FIG. 5.
Figure 12:
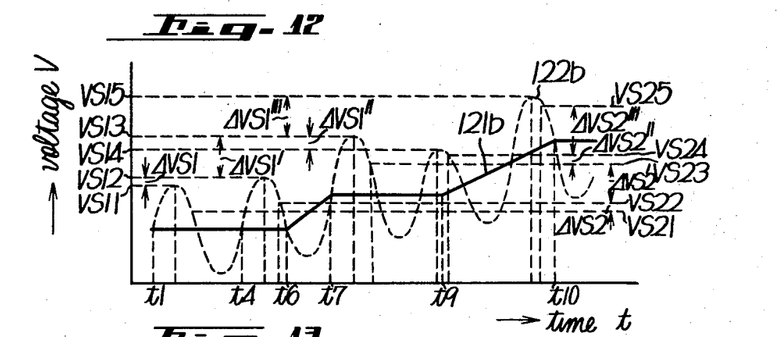
FIGS. 12, 13, 14 and 15 are graphs for explaining the operation of the guide groove detecting circuit shown in FIG. 11.
Figure 13:
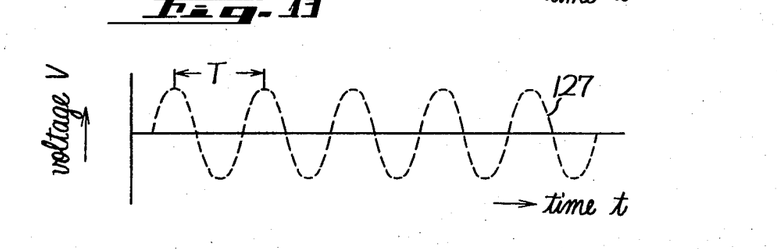

Referring now to FIG. 9, a description will be given in connection with one embodiment of this invention as applied to a record player. Reference numeral 106 indicates a record having formed thereon a plurality of different sound tracks 106a, 106b, and 106c and guide grooves 107a, 107b, 107c and 107d, 108 a turntable board and 109 a turntable. Reference numeral 110 designates generally a pickup which is assumed to rotate in a direction indicated by the cross in a circle ⊗, 111 a pickup arm, 112 a cartridge, 113 a stylus, 114 a weight balancer and 115 an arm bearing portion. The pickup arm 111 has linked thereto a rotary shaft 117 extending downwardly through the turntable board 108, and this rotary shaft 117 rotates with the rotational movement of the pickup arm 111 in a horizontal direction (indicated by the cross in a circle ⊗). The rotational angle detector 56 above described with FIG. 6 or 7 is mounted in association with the rotary shaft 117. Namely, the polarizing plate 103 (104 or 104a and 104b) is fixed to the rotary shaft 117 of the pickup arm 111, while the polarizing plate 104 (104a and 104b or 103) and the light source 101 are disposed on both sides of the polarizing plate 103 (104 or 104a and 104b) in opposed relation thereto. The photoelectric conversion element 102 or 102A and 102B is placed in the back of the polarizing plate 104 or 104a and 104b (or 103) at such position as described in connection with FIG. 7. In the present example the light source 101 and the photoelectric conversion element 102 or 102A and 102B are secured to the fixed part, but it is possible that either of them is fixed to the rotary shaft 117. A description will be made in connection with the operation of the rotational angle detector utilized as shown in FIG. 9. The output of the photoelectric conversion element gradually varies with the rotational movement of the pickup arm 111 as indicated by the curve $a1$ in FIG. 8. Though varying with different records, the pitches of the guide grooves 107a, 107b, 107c and 107d are greater than those of the sound track grooves 106a, 106b and 106c, so that the rotational speed of the pickup arm 111 for scanning the guide grooves is greater than that for scanning the sound tracks, and consequently the variation in the output obtained between the output terminals 119 and 120 relative to time increases. The output is representative of the feeding speed of a cutter and is as indicated by a curve 121 in FIG. 10. This output is applied to a differentiation circuit or the like to produce a pulse corresponding to a rapidly changing portion 121a of the curve 121, thereby to enable detection of the guide groove portions of the record. In FIG. 10 the abscissa represents the time $t$ in sec. for the rotation of the pickup arm and the ordinate the output voltage V in volt, the time $t1$ to $t6$ and $t7$ to $t10$ respectively indicating the scanning period for the sound tracks, for example, 106a and 106b, $t6$ to $t7$ the scanning period for the guide groove, for example, 107b and $t9$ $t10$ the scanning period for the grooves of the record which are formed at different pitches. In cutting the sound track grooves 106a and 106b of the record at varying pitch, 100 grooves or so are formed per inch for recording sound of great volume, in which case the groove width (refer to Ps in FIG. 4) is about 0.25 mm. Since the guide grooves are provided for discriminating adjacent sound tracks, they are considered to serve the purpose if they has sufficient width to perform that function. In the records now on the market the guide groove width (refer to Pu in FIG. 4) is as narrow as approximately 0.2 mm when it is extremely narrow, and adjacent sound tracks cannot be clearly distinguished. With the present invention the above drawback can be overcome. In practice, however, even if the rotational angle detection is effected with the output picked up as in the present invention, a waveform such as indicated by a broken-line curve 122 in FIG. 10 appears between the output terminals 119 and 120 due to deviation in the formation of the central hole of the record in manufacture and due to warping of the record after long use. The illustrated waveform is an output waveform picked up for every revolution of the record. The output waveform 122 undergoes relatively great fluctuations, by which it is rendered impossible to discriminate whether the output is produced by the guide grooves 107a to 107d or by eccentricity of the central hole of the record. Referring now to FIG. 11, a detailed description will be given in connection with a solution to the above problem. Reference numeral 123 indicates generally the guide groove detecting circuit described with FIG. 5, which separates the curve 121 from the output curve 122 of FIG. 10 to detect the guide groove portion 121a between $t6$ to $t7$. The output of the photoelectric conversion element 102 of the rotational angle detector 56 is picked up from between the output terminals 119 and 120 and is fed to a capacitor 124 for removing unnecessary DC components and is then amplified by a DC amplifier 125, thereafter being fed to a high cut-off filter 126. The resulting output waveform is as indicated by 122b in FIG. 12. This signal includes therein a pitch signal produced by the revolution of the record and an eccentric signal produced by the eccentric signal indicated by 127 in FIG. 13. The waveform 127 is a waveform having one repeating cycle T for every revolution of the record due to its distortion rendered in the pressing operation thereof and eccentricity of the player used. In order to remove the waveform 127 resulting from the eccentricity, the total output waveform 122b is subjected to sampling. For this purpose, the output of a clock pulse oscillator 128, which is synchronized with the cycle T of the turntable 109 and has a cycle of $1/n$ relative to the cycle T, is applied to a circuit 129 constituted by a flip-flop circuit or the like to produce timing pulses sequentially displaced in phase, and these timing pulses are fed to gate circuits G1 to Gn to be sampled as indicated by 57, thus deriving from the first gate circuit G1 a voltage VS11 depicted in FIG. 12. In a similar manner, voltages VS12 to VS1n (not shown) are derived from the second to nth gate circuits G2 to Gn, thus sampling the cycle T of a first turn of the record to be $1/n$. Next, the cycle T of a second turn of the record is sampled to be $1/n$, by which a voltage $VS_{21}$ such as shown in FIG. 12 is obtained from the gate circuit G1, and voltages $VS_{22}$ to $VS_{2n}$ (not shown) are derived from the second to nth gate circuits G2 to Gn. Thereafter, voltages $VS_{31}$ to $VS_{3n}$ ............ $VS_{n1}$ to $VS_{nn}$ are similarly derived from the first to nth gate circuits for every rotation of the record. The voltages, for example, $VS_{11}$ to $VS_{1n}$ thus obtained by the first turn of the record are respectively applied to a memory circuit 58 to be stored therein (refer to FIG. 5, included in peak-value detectors $D_l$ to $D_n$ in FIG. 11) and differences $\Delta VS_l$ to $\Delta VS_n$ (not shown) between the voltages $VS_{11}$ to $VS_{1n}$ and $VS_{21}$ to $VS_{2n}$ produced by the second rotation of the record are yielded by the first detectors $D_1$ to $D_n$. In a similar manner, the differences between the voltages produced by the third and fourth revolutions of the record .......... between $n-1$ th and $n$ th revolutions of the record, that is, $\{(\Delta VS_1')\sim(\Delta VS_n')\}$ $\{(\Delta VS_1'^{(n-2)})\sim(\Delta VS_n'^{(n-1)})\}$ are obtained.

Figure 15:
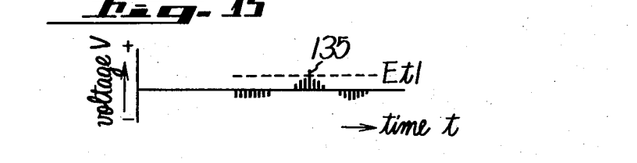

The voltages included in the brackets are in proportion to the revolving period of the record. The greatest pitch portion of the sound track grooves of varying pitch and the guide grooves cannot be detected with these voltages, so the output voltage 130 of the first detector is applied to the second detector 131 to pickup the voltage differences $(\Delta VS_1'-\Delta VS_2')$, $(\Delta VS_2'-\Delta VS_3')$, and so on, corresponding to the differences in the voltage peak values shown in FIG. 15. The resulting voltages vary with changes in the scanning speed of the pickup arm in response to the rotation of the record. Since the variations in the speed of the pickup arm on the sound track grooves of the maximum portion of the varying pitch are one-half to one-third of those of the pickup arm on the guide grooves, a monostable multivibrator 134 is operated with the output of an amplitude discriminator circuit, for example, a Schmitt circuit 132 which operates to produce rectangular signals when the signal emanating from the aforementioned second detector 131 exceeds a certain trigger level. In such a case, if a trigger level value $Et1$ is selected to exceed a maximum value of the change in the scanning speed of the pickup arm on the grooves of the maximum portion of the varying pitch as shown in FIG. 15, voltages exceeding a value indicated by 135 represent the changes in the scanning speed of the pickup arm on the guide grooves and consequently the guide grooves 107a to 107d can be detected.

Figure 16:
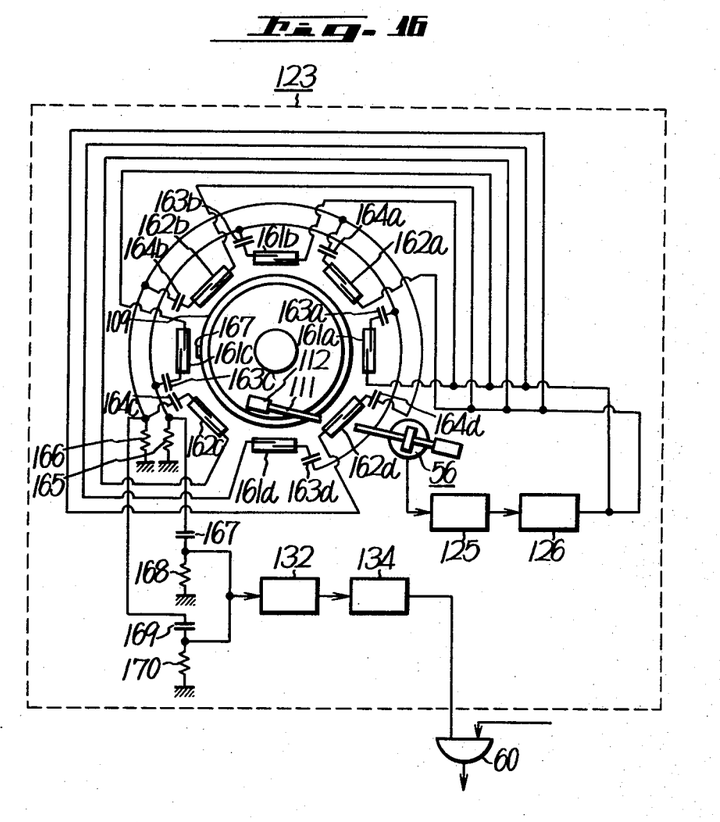
FIG. 16 is a schematic diagram for explaining the operation of another example of the guide groove detecting circuit.

In FIG. 16 there is illustrated another example of the guide groove detecting circuit, in which similar elements to those in FIG. 11 are identified by similar reference numerals.

Figure 14:
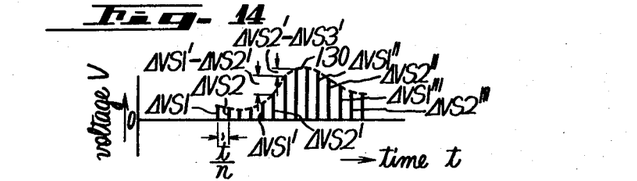

For sampling of the output from the rotational angle detector 56 with a switch synchronized with the revolution of the turntable so as to remove the component due to eccentricity of the central hole of the record from the output applied to the switch through the DC amplifier 125 and the high-cut filter, two sets of reed switches 161a, 161b, 161c, 161d and 162a, 162b, 162c, 162d are respectively disposed about the turntable 109 at equiangular intervals and a magnet 167 is mounted on the outer or inner peripheral surface of the turntable 109. The reed switches are adapted to be sequentially closed with the magnet 167 rotating with the turntable. In this case it is possible that the magnet is fixed and the reed switches are mounted on the turntable in a manner to be rotated therewith. Further each reed switch is connected to a resistor 165 connected in common to memory capacitors 163a, 163b, 163c and 163d and to another resistor 166 connected in common to memory capacitors 164a, 164b, 164c and 164d. When the reed switch, for example, 161a is closed a voltage $VS_{11}$ such as shown in FIG. 12 is stored in the capacitor 163a and the difference $\Delta VS_1$ between the voltages derived from the reed switch 161a for every rotation of the turntable is obtained from the resistor 165. Similar operations are effected with the other reed switches and the resulting outputs are combined together to produce pulses of such a waveform as depicted in FIG. 14. Then, the difference in the peak values, that is, $\Delta VS_1$ is further applied to a capacitor 167 and the difference $\Delta VS_2$ in the peak values of the voltages produced by the next turn of the record is likewise fed to the capacitor 167. If there is a difference between $\Delta VS_1$ and $\Delta VS_2$, a voltage corresponding to the difference is obtained across a resistor 168 connected to the capacitor 167 and this voltage is in proportion to the revolving speed of the record. In this case the resulting voltages increase with a decrease in the number of the sampling operations but simultaneous detection of the output voltages becomes difficult. To avoid this, in the present example two sets of four reed switches (sampling elements) are arranged in out-of-phase relation, and a system including the resistor 170 and the capacitor 169 is provided. The output voltages derived from the resistors are picked up at a level exceeding a certain value to provide voltages representative of the guide grooves. In order to assure the above discrimination between the sound track grooves and the guide grooves, sound derived from the pickup cartridge is detected by the sound detecting device 136 shown in FIG. 11. The sound detecting device consists of a sound detecting circuit 51, a circuit 59 for producing an output of the guide groove and a Schmitt circuit 139 and is adapted to produce an output only when no sound is produced for a certain period of time, the resulting output and an output previously detected from the preceding guide groove being applied to an AND circuit 60.

Figure 17:
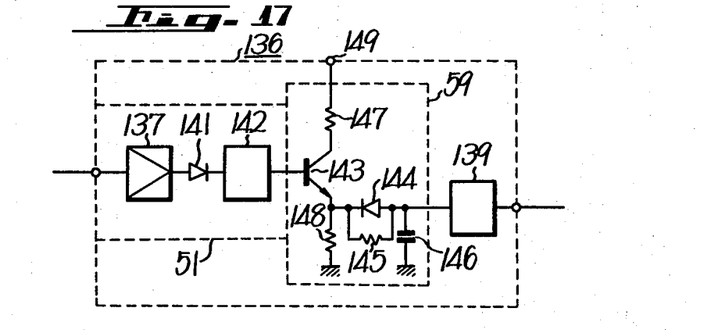
FIG. 17 is a circuit diagram of one example of a sound detecting circuit used in the present invention.
Figure 18:
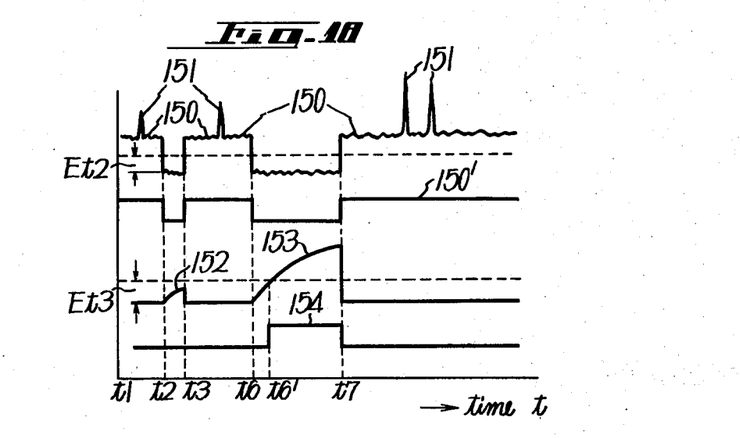
FIG. 18 is a graph showing the operation of the sound detecting circuit exemplified in FIG. 17.

Referring now to FIG. 17, a detailed description will be given of the sound detecting device 136. A sound output (a composite signal of right and left signal components in case of stereophonic signal) from the pickup cartridge 112 is amplified by an amplifier 137 and is then rectified by a rectifier circuit 141, after which the rectified output is applied to the sound detector circuit 59 through a waveform shaping circuit 142 and is then fed to the Schmitt circuit 139, providing a pulse output. In the present example the sound detector circuit 59 has a transistor 143 grounded through an emitter resistor 148 and the emitter is also grounded through a parallel circuit of a diode 144 and a resistor 145 and a capacitor 146 connected in series to the parallel circuits. One of the parallel circuits is connected to the Schmitt circuit 139. Reference numeral 147 designates a collector resistor and 149 a power source terminal. A signal, which is picked up when the stylus 113 of the pickup cartridge 112 scans the record 106 in its radial direction, is shown in FIG. 18A by 150. The times (on the abscissa) $t1$ to $t2$, $t3$ to $t6$ and after $t7$ indicate the presence of the sound track grooves of the record, and reference numeral 151 designates noise components. The time $t2$ to $t3$ indicates a non-signal portion in the sound track. Unless this non-signal portion is distinguished from the guide groove portion ($t6$ to $t7$), the non-signal portion in the sound being played back is detected in the form of an output corresponding to the guide groove. To settle this problem, the sound output from the pickup cartridge is sliced at a certain trigger level $Et2$ as shown in FIG. 18A to produce an output 150' depicted in FIG. 18B from the shaping circuit 142, which output is fed to the transistor 143, thus providing an output waveform such as shown in FIG. 18C which is dependent upon a discharge time constant determined by the capacitor 146 and the resistors 145 and 148. In this case, a waveform 152 of the non-signal period $t2$ to $t3$ in the sound being played back is removed by selecting the clip level at $Et3$. A waveform 153 of large discharge time constant is obtained in the form of a rectangular wave 154 in a period $t6'$ to $t7$ as shown in FIG. 18D. The Schmitt circuit 139 has been adapted to be inoperative in a period $t6$ to $t6'$. The resulting rectangular wave is one that is produced in the non-record period $t6$ to $t7$. Therefore, this rectangular wave and the output pulse from the rotational angle detector circuit are applied to the AND circuit 60 to produce an output only in the presence of both inputs. In this manner, the guide grooves can be detected more positively.

Figure 19:
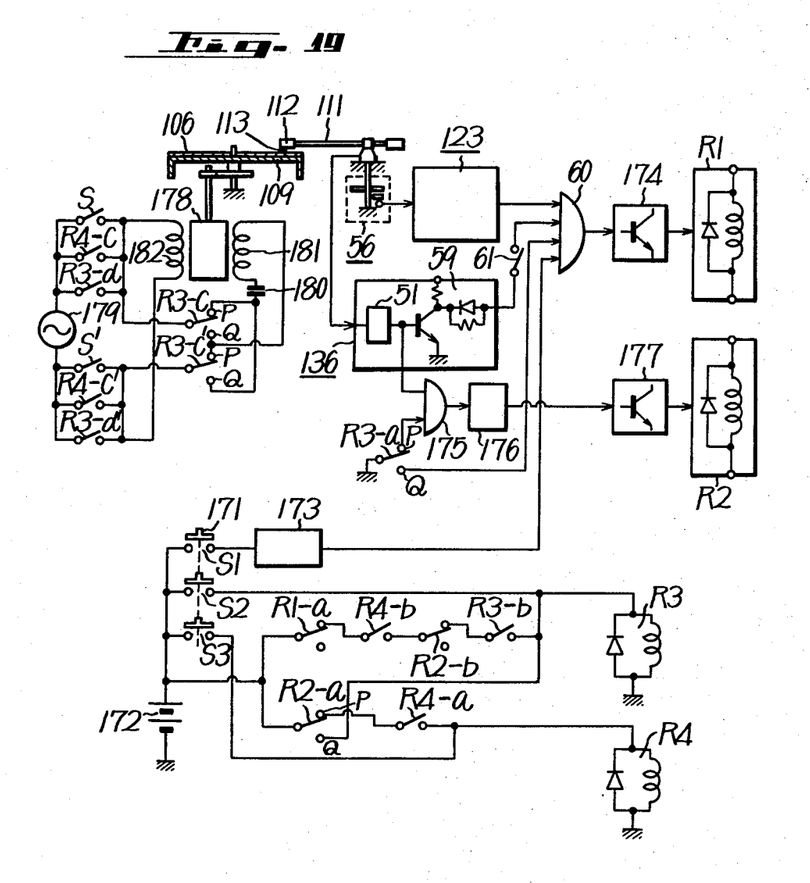
FIG. 19 is a connection diagram of one example of a circuit for driving the motor and the turntable.

Referring to FIG. 19, a description will be made in connection with the circuit for forward and backward drive of the turntable.

Various systems such as described at the beginning of the specification can be provided depending on the manual location of the stylus on the record.

The output of the rotational angle detector 56, which is applied to the AND circuit 60 through the guide groove detecting circuit 123 in response to the rotation of the rotary shaft 117 of the pickup arm 111, corresponds to the guide grooves of the record and the output is fed to a relay R1 through an amplifier 174. Then, the output of the pickup is applied to the AND circuit 60 through the sound detector circuit 51 of the sound detecting device 136 and the circuit 59 for preventing faulty operation in the discrimination of non-signal portions of sound signals from the guide groove portions of the record. Further, the output of the sound detector circuit 51 is fed to a relay R2 through an AND circuit 175, a monostable multivibrator 176 and, if necessary, an amplifier 177. In addition, contacts P and Q of a changeover contact R3-$a$ of a relay R3 described later are respectively connected to one input of the AND circuit 175 and the AND circuit 60. A stand-by push button 171 is provided, which has normally open contacts S1, S2 and S3. A DC power source 172 is connected through the contact S1 to a monostable multivibrator 173, the output of which is applied to the AND circuit 60. Further, the power source 172 is connected to relays R3 and R4 through the contacts S2 and S3, and in parallel with a series circuit of contacts R1-$a$, R4-$b$, R2-$b$ and R3-$b$ of the relays R1, R4, R2 and R3, a parallel circuit is provided which is closed at the contact Q of the contact R2-$a$ of the A series circuit including P, and the contacts R$_2$-$a$ and R$_4$-$a$ of the relays R2 and R4 is connected in parallel with the contact S3. A power source 179 for a turntable drive motor 178 is connected at both ends to one drive coil 182 of the motor 178 through contacts S and S' of a start button, normally open contacts R4-$c$ and R4-$c'$ of the relay R4 and normally open contacts R3-$d$ and R3-$d'$ of the relay R$_3$ and is further connected to the other drive coil 181 of the motor 178 through the aforementioned contacts, motor reversing contacts R3-$c$ and R3-$c'$ of the relay R3 and a phase advancing capacitor 180.

The changeover contacts R3-$a$, R2-$a$, R3-$c$ and R3-$c'$ are adapted to be in engagement with the contacts P as illustrated when they are not energized and to be on the contacts Q when energized.

The operation of the illustrated example will hereinbelow be discussed. When the sound track 106$a$ of the record 106 shown in FIG. 9 is to be played back, the pickup stylus 113 is manually located at the beginning of the sound track 106$a$. Then, the stand-by push button 171 is depressed to set the contacts S2 and S3 in the on state to actuate the relays R3 and R4, closing the contacts R4-$b$ and R3-$b$. In this case, even if the push button 171 is released, the relays R3 and R4 remain self-maintaining. With the operation of the relay R3 the changeover contacts R$_3$-$c$ and R3-$c'$ are brought from the contacts P to Q and the contacts R3-$a$ and R3-$a'$ are closed, thereby starting the motor 178 in a backward direction. As a result, the pickup cartridge is caused to rotate toward the guide groove 107$a$ preceding the sound track 106$a$ from the beginning of the sound track 106$a$ and when the guide groove 107$a$ is detected by the rotational angle detecting device 123 its detected output is applied to the AND circuit 60. While the stylus 113 scans the record in a direction opposite to the sound track 106$a$, the sound signal from the sound detector circuit 51 is fed to one end of the AND circuit 175. However, since the contact R3-$a$ of the relay R$_3$ is held on the contact Q as described above, the signal on the side of Q becomes [0] and the AND circuit 175 is in a condition of [1.0] and hence non-conductive. The result is that the relay R$_2$ becomes connected to one input of the AND circuit remaining nonconductive. In this case the contact P of the relay R3 passes therethrough a pulse of an output [1]. The monostable multivibrator is adapted to be in the off state when the stand-by push button 171 is pushed and to remain inoperative until the output is memorized by the memory device 58. Further, the monostable multivibrator is designed to become conductive until the guide groove is detected by the rotational angle detector and the output of the multivibrator is fed to one input of the aforementioned AND circuit 60. A signal representative of the absence of the sound signal in the guide groove is derived from the error detector circuit 59 and is applied to one input of the AND circuit 60, if necessary, through a switch 61. Therefore the AND circuit 60 satisfies [1.1.1.1] and drives the relay R$_1$. As a result of this, the contact R1-$a$ is turned off to open the holding circuit from R1-$a$, R4-$b$, R2-$b$ and R3-$b$ to render the relay R3 inoperative. In this case, since the relay R4 remains operative as described above, the contacts R3-$c$ and R3-$c'$ of the relay R3 are returned to the contact P to drive the motor 178 in a forward direction, and consequently the stylus 113 is caused to scan the record from the guide groove 107a to the sound track 106a. At this time, the changeover contact R3-a is turned onto the contact P and accordingly the output of the AND circuit 60 becomes zero to render the relay R1 inoperative. When the stylus 113 moves into the sound track 106a to reproduce the sound recorded therein, the reproduced output is applied to the AND circuit 175. In this case, since the changeover contact R3-a has been held on the contact Q, the AND circuit 175 produces an output to operate the monostable multivibrator 176 for a certain period of time, thereby to actuate the relay R2. In such a case the contact $R_2$-a of the relay R2 is turned onto the contact Q to render the relay R4 inoperative and the relay R3 operative. Consequently, the changeover contacts R3-a, R3-c and R3-c' are changed over again to reverse the revolution of the motor 178. The time for driving the motor in a reverse direction is dependent upon the operating time of the monostable multivibrator 176. Thus, when the monostable multivibrator 176 becomes inoperative, the relay $R_2$ is opened to turn the contact R2-a onto the contact P, with the result that the relay R3 is rendered inoperative to stop the motor 178. The operating time of the monostable multivibrator 176 is selected such that the stylus 113 of the cartridge 112 may be brought to a position a little past the beginning of the sound track 106a on the side of the guide groove 107a. In this manner, the beginning of the sound track desired to be reproduced can be automatically located, so that the desired sound track can be played back completely from the beginning thereof by pushing and locking a start button S.

It will be apparent that many modifications and variations may be effected without departing from the scope of the novel concepts of this invention.

We claim as out invention

1. In a sound track selection phonograph of the type having a pickup arm mounted for rotational movement, a rotary shaft mounted for corotation with the pickup arm, and a rotatable turntable adapted to rotate a grooved record medium which is scanned by the pickup arm, pickup arm rotational angle detecting means comprising:
   detecting means associated with the rotary shaft and producing an output signal varying as a function of the angular displacement of the pickup arm as the same scans a record;
   means for dividing the output signal of said detecting means into a plurality of signals during one revolution of the turntable;
   means for storing the divided output signals; and
   means for comparing a plurality of divided output signals produced by said detecting means in a next succeeding revolution of the turntable with the signals previously stored by said storing means to ascertain the differences between the signals and producing detecting signals.

2. In a sound track selection phonograph as defined in claim 1, said means for dividing the output of said detecting means comprising magnet means mounted on the turntable and a plurality of reed switches stationarily mounted around the turntable at regular intervals for actuation by said magnet means.

3. In a sound track selection phonograph as defined in claim 1, said means for comparing the plurality of divided output signals comprising a plurality of systems for comparing the divided output signals and the stored signals.

4. In a sound track selection phonograph as defined in claim 1, said means for comparing the differences of the divided output signals during a next succeeding revolution of the turntable comprising a capacitor and a resistor.

5. In a sound track selection phonograph as defined in claim 1, wherein the output derived from said comparing means is applied to a monostable multivibrator through a Schmitt circuit.

6. A sound track selection phonograph as claimed in claim 1 wherein the means for dividing the output of the pickup arm rotational angle detecting means into a plurality of signals during one turn of the record consists of a clock pulse oscillator synchronized with the revolving cycle of the record, a frequency demultiplier supplied with the output of the clock pulse oscillator for producing timing pulses sequentially displaced apart in phase and means for applying the output of the frequency demultiplier to a plurality of gate circuits for sampling the output of the pickup arm rotational angle detecting means.

7. A sound track selection phonograph as claimed in claim 6 wherein the means for memorizing the outputs of the sampling means and the means for comparing the sampled outputs respectively consist of capacitors connected to the gate circuits and a resistor connected in common to the capacitors.

8. In a sound track selection phonograph as defined in claim 1, said means for dividing the output signal of said detecting means comprising a clock pulse oscillator synchronized with the rotational movement of the turntable; a frequency demultiplier receiving an output of said clock pulse oscillator and producing timing pulses sequentially displaced apart in phase, means forming a plurality of gate circuits, and means for applying the output of said frequency multiplier to said plurality of gate circuits for sampling the output signal of said detecting means.

9. In a sound track selection phonograph as defined in claim 8, said means for storing the output of said sampling means, and said means for comparing the sampled outputs respectively comprising capacitors connected to said gate circuits and a resistor connected in common with said capacitors.

10. In a sound track selection phonograph as defined in claim 1, said means for dividing the output of said detecting means comprising a plurality of reed switches mounted on the turntable and circumferentially spaced therearound at regular intervals, and magnet means stationarily mounted adjacent the turntable for actuating said reed switches.

11. In a sound track selection phonograph as defined in claim 10, said means for storing the outputs of said sampling means and said means for comparing the sampled outputs respectively comprising capacitors respectively connected to said reed switches and a resistor connected in common to said capacitors.

12. In a sound track selection phonograph as defined in claim 1, said detecting means comprising:
   first polarizing plate means pivotally mounted on the rotary shaft;

second polarizing plate means secured to a stationary part;
a light source;
photoelectric conversion means,
said light source and said photoelectric conversion means being disposed in opposed relationship to each other with said first and second polarizing plate means therebetween.

13. In a sound track selection phonograph as defined in claim 12, said first and said second polarizing plate means being arranged so that an angle between their main axes varies in a range of 0 to 90° with the angular displacement of the rotary shaft.

14. In a sound track selection phonograph as defined in claim 12, means mounting said photoelectric conversion means on the rotary shaft, and means mounting said light source on a stationary part.

15. In a sound track selection phonograph as defined in claim 12, means mounting said light source on the rotary shaft and means mounting said photoelectric conversion means on a stationary part.

16. In a sound track selection phonograph as defined in claim 12, said second polarizing plate means comprising a pair of second polarizing plates disposed on substantially the same plane and arranged so that the main axis of either one of said second polarizing plates extends parallel with the axis of said first polarizing plate means, with the main axis of the other one of said second polarizing plates extending substantially at right angles to the main axis of said first polarizing plate means, and said photoelectric conversion means comprising a pair of photoelectric conversion elements respectively disposed in opposed relationship to said pair of second polarizing plates.

17. In a sound track selection phonograph as defined in claim 16, means mounting respective ones of said second polarizing plates on opposite ones of said pair of photoelectric conversion elements.

18. In a sound track selection phonograph as defined in claim 16, means electrically connecting said pair of photoelectric conversion elements to each other in a manner to produce a differential signal.

19. In a sound track selection phonograph as defined in claim 12, said first polarizing plate means comprising a pair of first polarizing plates disposed on substantially the same plane and arranged so that the main axis of either one of said first polarizing plates extends parallel of the main axis of said second polarizing plate means, with the main axis of the other one of said first polarizing plates extending substantially at right angles to the main axis of said second polarizing plate means, and said photoelectric conversion means comprising a pair of photoelectric conversion elements respectively disposed in opposed relationship to said pair of first polarizing plates.

20. In a sound track selection phonograph as recited in claim 19, means attaching said second polarizing plate means to said light source.

21. In a sound track selection phonograph as defined in claim 19, means electrically connecting said pair of photoelectric conversion elements to each other in a manner to produce a differential signal.

* * * * *